_United States Patent Office_

3,699,084
Patented Oct. 17, 1972

3,699,084
CHEMICALLY CURABLE LIQUID POLYENE-POLYTHIOL POLYMER COMPOSITION
Clifton L. Kehr, Silver Spring, and Walter R. Wszolek, Sykesville, Md., assignors to W. R. Grace & Co., New York, N.Y.
No Drawing. Application June 23, 1970, Ser. No. 49,207, which is a continuation-in-part of abandoned application Ser. No. 617,801, Feb. 23, 1967, which in turn is a continuation-in-part of abandoned application Ser. No. 567,841, July 26, 1966. Divided and this application June 25, 1971, Ser. No. 157,039
Int. Cl. C08d 1/00; C08f 1/10; C08c 11/54
U.S. Cl. 260—858                           14 Claims

ABSTRACT OF THE DISCLOSURE

The invention disclosed is for a new chemically curable liquid polymer composition which includes a liquid polyene component having a molecule containing at least two unsaturated carbon-to-carbon bonds disposed at terminal positions on a main chain backbone of the molecule, and a polythiol component having a molecule containing a multiplicity of pendant or terminally positioned —SH functional groups per average molecule. The chemically curable liquid polymer composition upon curing in the presence of a chemical free radical generating reagent forms odorless, solid, elastomeric products which may serve as sealants, coatings, adhesives, and molded articles.

---

The present application for U.S. Letters Pat. is a divisional of Ser. No. 49,027, filed June 23, 1970, which in turn is a continuation-in-part of copending application Ser. No. 617,801, filed Feb. 23, 1967, now abandoned, which in turn is a continuation-in-part of application Ser. No. 567,841, filed July 26, 1966, now abandoned.

This invention relates to a new high energy curable liquid composition which includes a liquid polyene component having a molecule containing at least two unsaturated carbon-to-carbon bonds disposed at terminal positions on a main chain of the molecule, a polythiol component having a molecule containing a multiplicity of pendant or terminally positioned —SH functional groups per average molecule, and a photocuring rate accelerator.

It is well known in the art that cure of internally unsaturated polymers such as polybutadiene or polyisoprene may be effected with polythiols. However, such polymers, due mainly to residual internal unsaturation after curing, are unstable either to thermal oxidation or ultra-violet catalyzed oxidation, and are subject to rapid attack by ozone. Eventually degradation and embrittlement results in the internal double bond polymers, substantially reducing their useful service life.

A limitation of commercially available liquid polyurethane prepolymers is the fact that they are terminated by isocyanate (—NCO) groups. These —NCO groups are extremely unstable in storage, and are highly water-sensitive such that under practical conditions, they react with traces of moisture from the atmosphere to form gaseous carbon dioxide and amino groupings which in turn react with more —NCO to form eventually a highly viscous, sometimes completely insoluble urea-extended chain network. In cases where insolubilization occurs, the polymer has to be discarded at great expense. Further, if the —NCO-terminated prepolymers come in contact with traces of either acidic or basic impurities, dimerization and/or trimerization of the —NCO functions may take place to form viscous, sometimes insoluble products during storage. Even mild alkalis such as those constituents normally present on the surface of glass vessels and containers may cause storage problems.

A further limitation for some applications is found in polyurethane polymers of the prior art which are derived from aromatic diisocyanates or polyisocyanates such as tolylene-2,4-diisocyanate, tolylene-2,6-diisocyanate, 4,4'-diisocyanatodiphenylmethane, and the like. These aromatic diisocyanates (or mixtures thereof) enjoy widespread use in polyurethane elastomers, foams, and coatings, because of their ready commercial availability, high degree of reactivity and relatively low cost. The derived polyurethane products, however, are known to turn yellow, amber, orange or brown in color when exposed to sunlight, ultraviolet light or other forms of actinic radiation. This yellowing tendency imparts a definite limitation on the usage of such polyurethanes in many applications. There is evidence in the technical literature that shows that this yellowing or discoloration problem is directly attributable to the aromatic (benzeneoid) nucleus in the aromatic diisocyanates, and accordingly serious yellowing problems in polyurethanes may be avoided by use of aliphatic polyisocyanates such as hexamethylene diisocyanate. These aliphatic polyisocyanates, however, are difficult to manufacture, are relatively expensive and are relatively slow in reaction rate during polymer formation reactions in comparison to the aromatic polyisocyanates.

The use of polymeric liquid polythiol polymers which are cured to solid elastomeric products by oxidative coupling of the thiol (—SH) groups to disulfides (—S—S— groups) are known in the sealants, coatings and adhesives field. Oxidizing agents such as $PbO_2$ are commonly used to effect this curing reaction. These mercapto-containing compounds, however, both before and after curing with $PbO_2$-type curing system yield elastomeric compositions with an offensive odor which limits their usefulness generally to outdoor service. Thus, oxidatively-cured mercapto polymer systems have found restricted commercial acceptance due to their offensive odors.

A limitation of commercial liquid polymeric sealants and coatings is found in one-package systems. All the compounding ingredients, including the curing agents, are blended together and charged into a tightly sealed container until used. In these commercial sealants (polysulfides, polydisulfides, polymercaptans, polyurethane and polysilicones), the curing reaction of one-package systems is initiated by moisture ($H_2O$) from the air. The moisture-curable systems leave something to be desired because the moisture content of the air varies widely. Hence, the curing performance of moisture-curable adhesives, coatings and sealants is variable and is difficult to predict and control. In the case of polyurethanes a further disadvantage of moisture-curable systems is observed. In the curing reaction (—NCO groups reacting with $H_2O$) a volatile gas (carbon dioxide) is liberated and this evolved gas tends to cause unsightly and property-weakening gas pockets or voids in the final product.

It has now been found that numerous defects of the prior art may be effectively overcome by practice of the present invention which provides a new chemically curable liquid composition which contains particular polyenes which are curable with polythiols to solid resins or elastomers. For example, when urethane-containing polyenes are compounded with polythiols, the prepared composition may be stored safely for long periods of time in the absence of a chemical free radical generating reagent. Upon exposure to a chemical free radical generating reagent, the system cures rapidly and controllably to a polythioether-polyurethane product which is low in cost and equal or better in reaction rate in polymer formation when compared with compositions derived from conventional technology.

Generally stated, the present invention provides a curable composition which comprises a particular polyene component, a polythiol component, and a chemical free radical generating reagent.

The polyene component may be represented by the formula:

wherein $m$ is an integer of at least 2, wherein X is a member selected from the group consisting of:

(a) 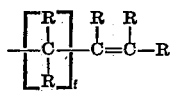

(b) 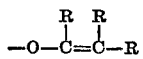

(c) 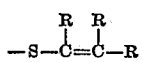

(d) 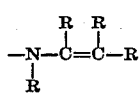

(e) 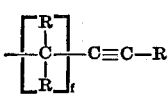

In the groups (a) to (e), $f$ is an integer from 1 to 9; R is a radical selected from the group consisting of hydrogen, fluorine, chlorine, furyl, thienyl, pyridyl, phenyl and substituted phenyl, benzyl and subtsituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms.

The members (a) to (e) are connected to [A] through divalet chemically compatible derivative members. The members (a) to (e) may be connected to [A] through a divalent chemically compatible derivative member of the group consisting of Si(R)$_2$, carbonate, carboxylate, sulfone, —O—,

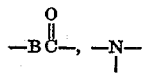

alkyl and substituted alkyl, cycloalkyl and substituted cycloalkyl, urethane and substituted urethane, urea and substituted urea, amide and substituted amide, amine and substituted amine, and aryl and substituted aryl. The alkyl members have from 1 to 9 carbon atoms, the aryl members are either phenyl or naphthyl, and the cycloalkyl members have from 3 to 8 carbon atoms with R and said members substituted being defined above. B is a member of the group consisting —O—, —S—, and —NR—.

The member [A] is polyvalent; free of reactive carbon-to-carbon unsaturation; free of highly water-sensitive members; and consisting of atoms selected from the group consisting of carbon, oxygen, nitrogen, chlorine, bromine, fluorine, phosphorus, silicon and hydrogen.

The polyene component has a molecular weight in the range from about 64 to 20,000, preferably about 200 to about 10,000, and a viscosity in the range from essentially 0 to 20 million centipoises at 70° C. as measured by a Brookfield Viscometer.

The polythiol component has a molecular weight in the range from about 50 to about 20,000 and the general formula:

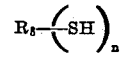

wherein $R_8$ is a polyvalent organic moiety free from reactive carbon-to-carbon unsaturation and $n$ is at least 2. The ene/thiol mole ratio is selected so as to provide a solid, self-supporting cured product under ambient conditions in the presence of a free radical generator.

More particularly, the member [A] of the polyene composition may be formed primarily of alkyl radicals, phenyl and urethane derivatives, oxygenated radicals, and nitrogen substituted radicals. The member [A] may also be represented by the formula:

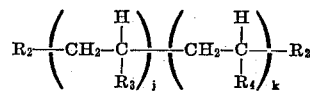

wherein $j$ and $k$ are integers greater than 1; $R_2$ is a member of the group consisting of hydrogen, and alkyl having 1 to 9 carbon atoms; $R_3$ is a member of the group consisting of hydrogen, and saturated alkyl having 1 to 9 carbon atoms; $R_4$ is a divalent derivative of the group consisting of phenyl, benzyl, alkyl, cycloalkyl, substituted phenyl, substituted benzyl, substituted alkyl and substituted cycloalkyl; with the terms alkyl cycloalkyl and members substituted being defined above.

General representative formulas for the polyenes of the present invention may be prepared as exemplified below:

I. POLY (ALKYLENE-ETHER) POLYOL REACTED WITH UNSATURATED MONOISOCYANATES FORMING POLYURETHANE POLYENES AND RELATED POLYMERS

Difunctional

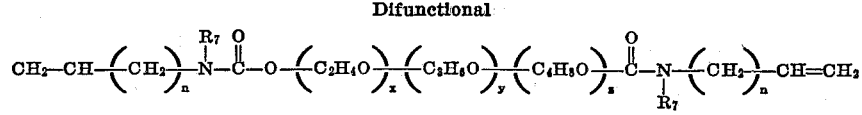

Trifunctional

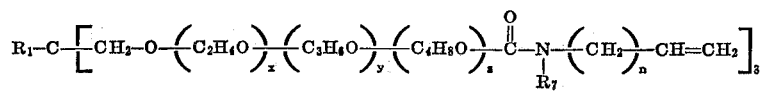

Tetrafunctional

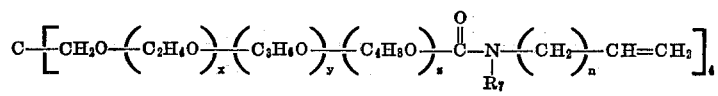

Tri-to-Hexafunctional

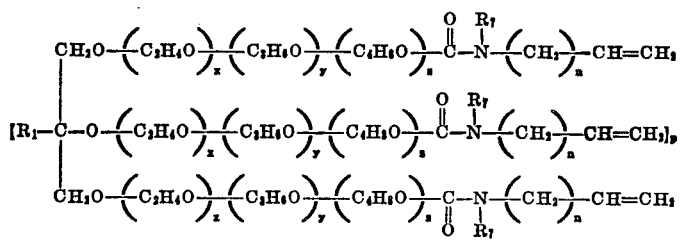

Interconnected-modified difunctional

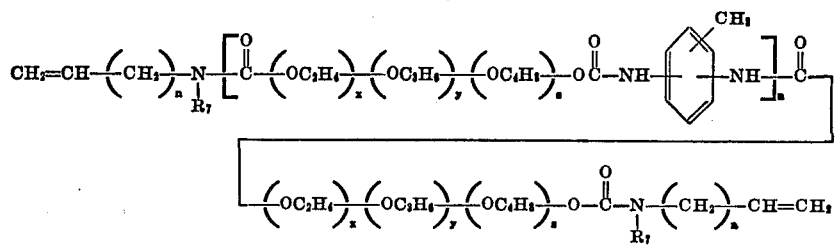

Interconnected-modified tetrafunctional

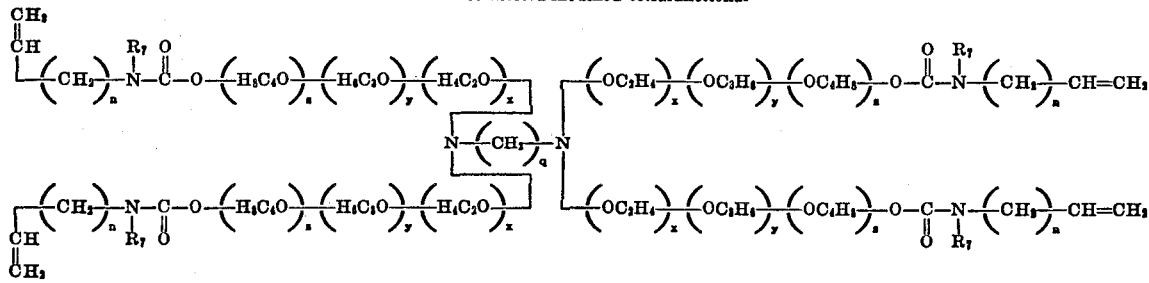

II. POLY (ALKYLENE-ESTER) POLYOL REACTED WITH UNSATURATED MONOISOCYANATES FORMING POLYURETHANE POLYENES AND RELATED POLYMERS

Difunctional

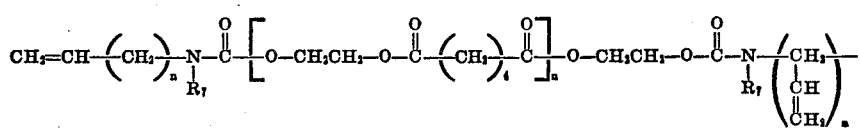

Interconnected-modified difunctional

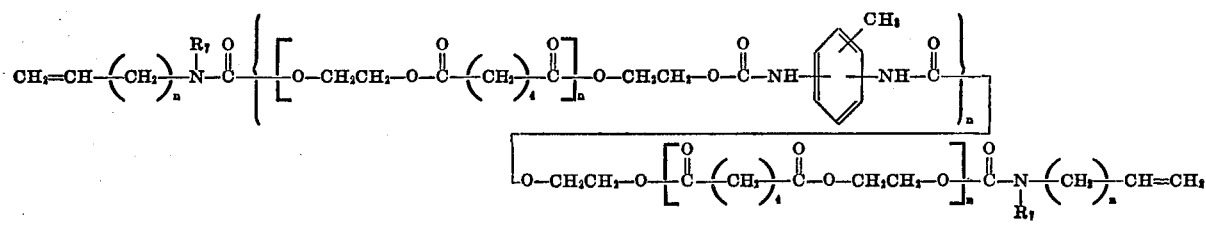

III. POLY (ALKYLENE-ETHER) POLYOL REACTED WITH POLYISOCYANATE AND UNSATURATED MONOALCOHOL FORMING POLYURETHANE POLYENES AND RELATED POLYMERS

Difunctional

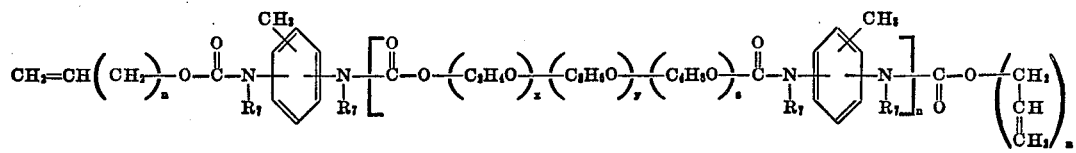

Trifunctional

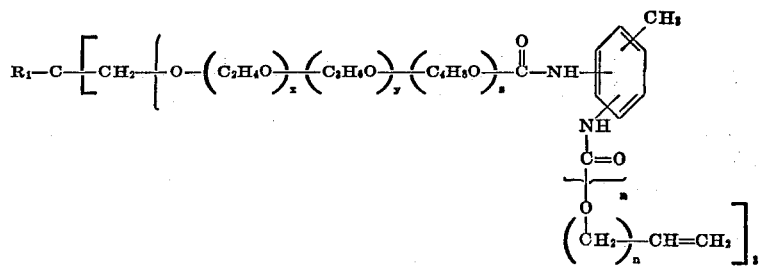

Tetrafunctional

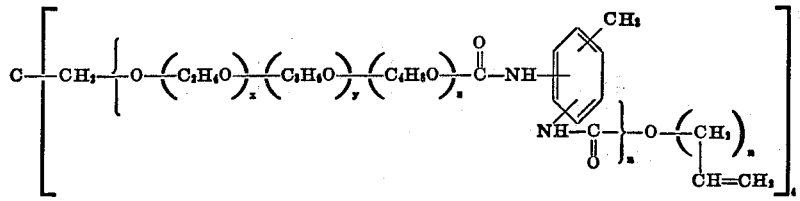

In the above formulas, the sum of $x+y+z$ in each chain segment is at least 1; P is an integer of 1 or more; $q$ is at least 2; $n$ is at least 1; $R_1$ is selected from the group consisting of hydrogen, phenyl, benzyl alkyl, cycloalkyl, and substituted phenyl; and $R_7$ is a member of the group consisting of

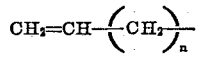

hydrogen, phenyl, cycloalkyl, and alkyl.

The novel class of polyenes of this invention derived from carbon to carbon unsaturated monoisocyanates may be characterized by extreme ease and versatility of manufacture when the liquid functionality desired is greater than about three. For example, consider an attempted synthesis of a polyhexene starting with an —OH terminated polyalkylene ether hexol such as "Niax" Hexol LS-490 (Union Carbide Corp.) having a molecular weight of approximately 700, and a viscosity of 18,720 cps. at 20° C. An attempt to terminate this polymer with ene groups by reacting one mole of hexol with 6 moles of tolylene diisocyanate (mixed-2,4-, -2-6-isomer product) and 6 moles of allyl alcohol proceeded nicely but resulted in a prematurely chain extended and crosslinked solid product rather than an intended liquid polyhexene. Using the monoisocyanate route, however, this premature chain extension may be avoided and the desired polyurethane-containing liquid polyhexene may be very easily prepared by a simple, one-step reaction of one mole of hexol with 6 moles of allyl isocyanate. This latter polyhexene has the added advantage of being cured using the teachings of this invention to a non-yellowing polythioether polyurethane product. Similarly, the unsaturated monoisocyanate technique may be used to prepare liquid polyenes from other analagous highly functional polyols such as cellulose, polyvinyl alcohol, partially hydrolized polyvinyl acetate, and the like, and highly functional polyamines such as tetraethylene pentamine, polyethyleneimine, and the like.

A general method of forming one type of polyene containing urethane groups is to react a polyol of the general formula

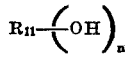

wherein $R_{11}$ is a polyvalent organic moiety free from reactive carbon-to-carbon unsaturation and $n$ is at least 2; with a polyisocyanate of the general formula

wherein $R_{12}$ is a polyvalent organic moiety free from reactive carbon-to-carbon unsaturation and $n$ is at least 2 and a member of the group consisting of an ene-ol, yne-ol, ene-amine and yne-amine. The reaction is carried out in an inert moisture-free atmosphere (nitrogen blanket) at atmospheric pressure at a temperature in the range from 0 to about 120° C. for a period of about 5 minutes to about 25 hours. In the case where an ene-ol or yne-ol is employed, the reaction is preferably a one step reaction wherein all the reactants are charged together. In the case where an ene-amine or yne-amine is used, the reaction is preferably a two step reaction wherein the polyol and the polyisocyanate are reacted together and thereafter preferably at room temperature, the ene-amine or yne-amine is added to the NCO terminated polymer formed. The group consisting of ene-ol, yne-ol, ene-amine and yne-amine are usually added to the reaction in an amount such that there is one carbon-to-carbon unsaturation in the group member per hydroxyl group in the polyol and said polyol and group member are added in combination in a stoichiometric amount necessary to react with the isocyanate groups in the polyisocyanate.

A second general method of forming a polyene containing urethane groups (or urea groups) is to react a polyol (or polyamine) with an ene-isocyanate or an yne-isocyanate to form the corresponding polyene. The general procedure and stoichiometry of this synthesis route is similar to that described for polyisocyanates in the preceding. In this instance, a polyol reacts with an ene-isocyanate to form the corresponding polyene. It is found, however, that products derived from this route, when cured in the presence of a chemical free radical generating reagent and a polythiol, may form relatively weak solid polythioether products. To obtain stronger cured products, it is desirable to provide polar functional groupings within the main chain backbone of the polymeric polyene. These polar functional groupings serve as connecting linkages between multiple repeating units in the main chain series, and serve as internal strength-reinforcing agents by virtue of their ability to create strong interchain attraction forces between molecules of polymer in the final cured composition.

Polyenes containing ester groups may be formed by reacting an acid of the formula

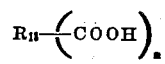

wherein $R_{13}$ is a polyvalent organic moiety free from reactive carbon-to-carbon unsaturation and $n$ is at least 2; with either an ene-ol or yne-ol. The reaction is carried out in an inert moisture-free atmosphere (nitrogen blanket) at atmospheric pressure at a temperature in the range from 0 to about 120° C. for a period of 5 minutes to 25 hours. Usually the reaction is carried out in the presence of a catalyst (p-toluene sulfonic acid) and in the presence of a solvent, e.g. benzene at refluxing temperature. The water formed is azeotroped off of the reaction.

Another method of making an ester containing polyene is to react a polyol of the formula

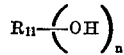

wherein $R_{11}$ is a polyvalent organic moiety free from reactive carbon-to-carbon unsaturation and $n$ is at least 2; with either an ene-acid or an yne-acid. The reaction is carried out in the same manner as set out above for the ester-containing polyenes. In practicing this latter technique, however, it may be found that ene-acids (or yne-acids) in which the ene (or yne) group is adjacent to an activating polar moiety such as

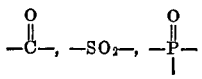

and the like are generally not desirable within the scope of this invention. These activated ene compounds are very prone to self-polymerization reactions to form vinyl polymers. Excessive amounts of self-polymerization of the ene groups is an undesirable side reaction in the present invention since the desired polythioether reaction products are precluded whenever self-polymerization of the ene groups occurs. Finally, the presence of activated, easily self-polymerizable ene groups in the composition leads to oxygen inhibition during curing, storage stability problems, or the need for excessively high inhibitor concentrations.

In forming the urethane-containing polyenes of the present invention, catalytic amounts of a catalyst may be employed to speed up the reaction. This is especially true in the case where an ene-ol is used to form the polyene. Such catalysts are well known to those in the art and include organometallic compounds such as stannous octoate, stannous oleate, dibutyl tin dilaurate, cobalt acetylacetonate, ferric acetylacetonate, lead naphthanate and dibutyl tin diacetate.

In summary, by admixing polyenes or polyynes containing two or more reactive unsaturated carbon-to-carbon bonds located terminal from the main chain with a polythiol containing two or more thiol groups per molecule and thereafter exposing said liquid mixture to a chemical free radical generating reagent, there is provided an essentially odorless solid elastomeric or resinous polymeric product.

Polythiol as used herein refers to simple or complex organic compounds having a multiplicity of pendant or terminally positioned —SH functional groups per average molecule.

On the average the polythiol must contain 2 or more —SH groups/molecule and have a viscosity range of essentially 0 to 20 million centipoises (cps.) at 70° C. as measured by a Brookfield Viscometer either alone or when in the presence of an inert solvent, aqueous dispersion or plasticizer. Operable polythiols in the instant invention usually have molecular weights in the range about 50 to about 20,000, and preferably from about 100 to about 10,000.

The polythiols operable in the instant invention may be exemplified by the general formula

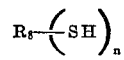

where $n$ is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable with polyenes to obtain essentially odorless polythioether products are esters of thiol-containing acids of the formula HS—$R_9$—COOH where $R_9$ is an organic moiety containing no reactive carbon-to-carbon unsaturation with polyhydroxy compounds of structure

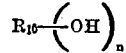

were $R_{10}$ is an organic moiety containing no reactive carbon-to-carbon unsaturation, and $n$ is 2 or greater. These components will react under suitable conditions to give a polythiol having the general structure:

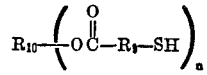

where $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thioglycolic acid

α-mercaptopropionic acid (HS—CH(CH$_3$)—COOH and β-mercaptopropionic acid (HS—CH$_2$CH$_2$COCH) with polyhydroxy compounds such as glycols, triols, tetraols, pentaols, hexaols, and the like. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

Prior to curing, the curable liquid polymer may be formulated for use as 100% solids, or disposed in organic solvents, or as dispersions or emulsions in aqueous media.

The curable liquid polymer compositions prior to curing may readily be pumped, poured, siphoned, brushed, sprayed, doctored, or otherwise handled as desired. Following application, curing in place to a solid resin or elastomer may be effected either very rapidly or extremely slowly as desired by manipulation of the compounding ingredients and the method of curing.

The liquid polythioether-forming components and compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

Although the mechanism of the curing reaction is not completely understood, it appears most likely that the curing reaction may be initiated by most any chemical free radical generating reagent which dissociates or abstracts a hydrogen atom from an SH group, or accomplished the equivalent thereof. Generally the rate of the curing reaction may be increased by increasing the temperature of the composition at the time of initiation of cure. In many applications, however, the curing is accomplished conveniently and economically by operating at ordinary room temperature conditions. Thus for use in elastomeric sealants, it is possible merely to expose the polyene and polythiol admixture to a chemical free radical generating reagent such as oxygen containing gas and obtain a cured solid elastomeric or resinous product.

By proper choice of type and concentration of chemical free radical generating reagent, the curing period required for conversion of the polyene/polythiol composition from the liquid to the solid state may be varied greatly as desired. In combination with suitable accelerators or retarders, the curing period in the presence of the various chemical free radical generating reagents may vary from about a few minutes or less to about 30 days or more. In general, the short curing periods are achieved in applications where thin films of curable composition are required, such as in the field of coatings, whereas the long curing periods are achieved and desired where more massive layers of composition are required, such as in the field of elastomeric sealants.

Chemical free radical generating reagents operable in this invention include oxygen; ozone; chlorine; organic peroxides and hydroperoxides; peracids; persulfates; inorganic peroxides; and azo compounds such as azobisisovaleronitrile. Certain of these compounds may be made more effective and efficient if used in conjunction with co-agent curing rate accelerators. Examples of accelerated systems may include benzoyl peroxide with dimethylaniline as an accelerator; cumene hydroperoxide with cobalt naphthenate as an accelerator; and the like. Included in this class are reagents or components which are generated in situ in the composition. Curing periods may be varied, but the reactions are generally relatively fast. Conversions from liquid to solid state may occur within a few minutes.

The chemical free radical generating reagent is usually added in an amount ranging from about 0.0005 to about 25% by weight of the photocurable composition, with the preferred range being from about 0.05 to about 5% by weight.

Conventional curing inhibitors or retarders which may be used in order to stabilize the components or curable compositions so as to prevent premature onset of curing may include hydroquinone; p-tert.-butyl catechol; 2,6-di tert.-butyl-p-methylphenol; phenothiazine; N-phenyl-2-naphthylamine; inert gas atmospheres such as helium, argon, nitrogen and carbon dioxide; vacuum; and the like.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

The compositions to be cured, i.e. (converted to solid resins or elastomers) in accord with the present invention may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.0005 to about 300 parts on the same basis.

The compounding of the components prior to curing may be carried out in several ways. For example, the polyene, the polythiol and any other inert additives may be admixed in an inert atmosphere and charged to an oxygen-free aerosol can, drum, tube, or cartridge for subsequent use. Exposure of admixed components to the atmosphere under ambient conditions will initiate curing. To initiate instantaneous oxygen-initiated curing, it is possible to merely admix the polyene and the polythiol under atmospheric conditions in the absence of stabilizers or inhibitors.

The mole ratio of ene/thio for preparing the curable composition from about 0.2/1 to about 5/1, and desirably about 0.75/1 to about 1.5/1.

The following examples will aid in explaining, but should not be deemed as limiting, the instant invention. In all cases, unless otherwise noted, all parts and percentages are by weight.

FORMATION OF POLYENE PREPOLYMER

Example 1

458 g. (0.23 mole) of a commercially available liquid polymeric diisocyanate sold under the trade name "Adiprene L–100" by E. I. du Pont de Nemours & Co. was charged to a dry resin kettle maintained under a nitrogen atmosphere and equipped with a condenser, stirrer, thermometer, and gas inlet and outlet. 37.8 g. (0.65 mole) of allyl alcohol was charged to the kettle and the reaction was continued for 17 hours with stirring at 100° C. Thereafter the nitrogen atmosphere was removed and the kettle was evacuated 8 hours at 100° C. 50 cc. dry benzene was added to the kettle and the reaction product was azeotroped with benzene to remove the unreacted alcohol. This allyl terminated liquid prepolymer had a molecular weight of approximately 2100 and will be referred to as Prepolymer A hereinafter.

Example 2

400 g. (0.2 mole) of "Adiprene L–100" was charged to a dry resin kettle maintained under nitrogen and equipped with a condenser, stirrer, thermometer and gas inlet and outlet. 25.2 g. (0.43 mole) of propargyl alcohol ($HC \equiv C-CH_2OH$) was added to the kettle and the reaction was continued with stirring for 18 hours at 160° C. Thereafter the nitrogen atmosphere was removed and the kettle was evacuated 16 hours at 100° C. followed by azeotropic distillations with 50 cc. water and then 50 cc. benzene to remove any excess propargyl alcohol. This $HC \equiv C-$ terminated liquid prepolymer had a viscosity of 27,500 centipoises at 70° C. and a molecular weight of 2100 and will be referred to as Prepolymer B hereinafter.

Example 3

1 mole of commercially available poly(ethylene ether) glycol having a molecular weight of 1450 and a specific gravity of 1.21 was charged to a resin kettle maintained under nitrogen and equipped with a condenser, stirrer, thermometer and a gas inlet and outlet. 2.9 g. dibutyl tin dilaurate as a catalyst was charged to the kettle along with 2 moles tolylene-2,4-diisocyanate and 2 moles of allyl alcohol. The reaction was continued with stirring at 60° C. for 2 hours. Thereafter a vacuum of 1 mm. was applied for 2 hours at 60° C. to remove the excess alcohol. This $CH_2 = CH-$ terminated prepolymer had a molecular weight of approximately 1950 and will hereinafter be referred to as Prepolymer C.

Example 4

1 mole of a commercially available poly(propylene ether) glycol having a molecular weight of about 1958 and a hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2=CH-$ terminated liquid prepolymer had a molecular weight of approximately 2400 and will hereinafter be referred to as Prepolymer D.

Example 5

750 g. of a N-containing tetrol (hydroxyl functionality=4) available from Wyandotte Chemicals Corp. under the trade name "Tetronic Polyol 904" having a M.W. of 7,500 was placed in a reaction vessel heated at 110° C. The flask was maintained under vacuum for 1 hour. Then, under an atmosphere of nitrogen, 0.1 cc. dibutyl tin dilaurate was added and the flask was cooled to 50° C. Now 18.3 g. allyl isocyanate was added slowly, maintaining the temperature at about 95° C. for about 1 hour after the addition was completed. The thus formed polymeric polyene (i.e., Prepolymer E hereinafter) had a theoretical allyl functionality of 2.2, a theoretical hydroxyl functionality of 1.8, and a calculated molecular weight of about 7,683.

Example 6

To a resin kettle maintained under a nitrogen atmosphere and equipped with a condenser, stirrer, thermometer and gas inlet and outlet was added 843 g. of a commercially available liquid diisocyanate prepolymer sold under the trade name "Multrathane F-196" by Mobay Chemical Co., said prepolymer having a molecular weight of about 1680 and an available isocyanate content of 4.7–5.2%. 87 g. (1.5 moles) of allyl alcohol was added to the kettle and the reaction was continued for 18 hours at 140° C. with stirring. Thereafter the nitrogen atmosphere was removed and the kettle was evacuated for 22 hours at 100° C. 50 cc. of dry benzene was added to the kettle and the reaction product was azeotroped therewith to remove any unreacted alcohol. This $CH_2=CH-$ terminated liquid prepolymer had a viscosity of 25,000 centipoises at 70° C. and a molecular weight of approximately 1800 and will be referred to as Prepolymer F hereinafter.

Example 7

678 g. (0.34 mole) of a commercially available poly (propylene ether) glycol sold under the trade name NIAX by Union Carbide Co. and having a molecular weight of about 2025 was degassed for 2 hours at 100° C. and thereafter charged to a resin kettle maintained under a nitrogen atmosphere and equipped with a condenser, stirrer, thermometer and gas inlet and outlet. 118 g. (0.68 mole) of tolylene 2,4-diisocyanate was charged to the kettle and the reaction was heated with stirring for 2¾ hours at 120° C. After cooling, 58 g. (1.0 mole) of allyl alcohol was added to the kettle and the mixture was refluxed at 120° C. for 16 hours under nitrogen. Excess allyl alcohol was removed overnight by vacuum at 100° C. Half of the allyl terminated liquid prepolymer having a viscosity of 19,400 cps. at 30° C. as measured on a Brookfield Viscometer was removed from the kettle and will be referred to hereinafter as Prepolymer G. The other half portion of the prepolymer was combined with 50 cc. of dry benzene and azeotroped overnight following which excess benzene was pulled out under vacuum for 5 hours at 120° C. This portion of the allyl-terminated liquid prepolymer had a viscosity of 15,600 cps. at 70° C. as measured on a Brookfield Viscometer and a molecular weight of approximately 2500 and will hereinafter be referred to as Prepolymer H.

Example 8

751 g. (0.38 mole) of a commercially available poly (propylene ether) glycol sold under the trade name "Pluracol P 2010" by Wandotte Chemical Co. was degassed at room temperature for 3 hours and then charged to a dry resin kettle maintained under a nitrogen atmosphere and equipped with a condenser, stirrer, thermometer and gas inlet and outlet. 132 g. (0.76 mole) of tolylene-2,4-diisocyanate was charged to the kettle and the kettle was heated for 2 hours at 120° C. with stirring under nitrogen. After cooling 58 g. (1.0 mole) of allyl alcohol was added and the mixture was refluxed at 120° C. overnight. Excess allyl alcohol was stripped by vacuum overnight at 120° C. The thus formed allyl terminated liquid prepolymer had a viscosity of 15,000 cps. as measured on a Brookfield Viscometer at 70° C. and a molecular weight of approximately 2500 and will hereinafter be referred to as Prepolymer I.

Example 9

To a 1 liter resin kettle equipped with stirrer, thermometer, gas inlet and outlet and heated to a temperature of 50° C. was charged 610 g. (0.2 mole) of poly(tetramethylene ether) glycol, commercially available from Quaker Oats Co. and having a hydroxyl number of 37.1 along with 0.3 g. dibutyl tin dilaurate. The temperature of the kettle was raised to 110° C. and the contents were freed of water under 1 millimeter vacuum for 1 hour. The resin kettle was cooled to 60° C. and the systtem was placed under a protective atmosphere of nitrogen throughout the remainder of the reaction. 25.2 g. of allyl isocyanate (0.4 mole) was added dropwise to the kettle at such a rate as to maintain the temperature at 60° C. When the NCO content dropped to 0.54 mg./g., 1 mm. vacuum again was applied and the system was heated at 70° C. for one hour. The thus formed polymer product was a solid at room temperature but at 50° C. is clear and pourable. The polymer product had a viscosity of 1,800 centipoises at 70° C. as measured on a Brookfield Viscometer and an average molecular weight of approximately 3200.

Example 10

To a 1 liter resin kettle equipped with stirrer, thermometer, gas inlet and outlet was charged 591 g. (0.30 mole) of a poly(propylene ether) glycol commercially available from Union Carbide under the trade name "PPG 2025" and 0.3 g. of dibutyl tin dilaurate. The kettle was heated to 110° C. and the contents were freed of water under 1 mm. vacuum for 1 hour. The kettle was cooled to 25° C. and the system was placed under a protective atmosphere of nitrogen throughout the remainder of the reaction. 53.1 ml. (49.8 g., 0.6 mole) of allyl isocyanate commercially available from Chemetron Corp. was added to the system. An exotherm carried the temperature to 45° C. in 22 minutes. After 60 minutes, the NCO content (as determined by titration) was 0.04 mg./g. The system was placed under 1 mm. vacuum and heated to 70° C. to remove traces of unreacted allyl isocyanate. The resultant polymer product had a viscosity of 600 centipoises at 30° C. as measured on a Brookfield Viscometer and an average molecular weight of approximately 2200.

The next two examples show a method of preparing the polyenes of the instant invention by dehydration of polyether glycols.

Example 11

100 g. of poly(propylene ether) glycol commercially available from Union Carbide under the trade name "PPG 2025" was poured through a hot tube filled with aluminum oxide at such a rate that the entire reaction took place in 2 hours. The tube was 1" in diameter with the reaction zone 1 ft. long and completely enclosed within a tube furnace. The alumina catalyst was 10–18 mesh and was maintained at 350° C. using a Lindberg Hevi-Duty tube furnace. The tube was fitted with a dropping funnel and a nitrogen inlet at the top. Nitrogen pressure was kept on the system throughout the reaction. The product collected from the bottom of the tube was analyzed for unsaturation by the mercuric acetate titration method and was found to have 100% of the theoretical amount of unsaturation expected after dehydration of both terminal hydroxyl groups of the poly(propylene ether) glycol. The polyene product had a viscosity of 125 cps. at 70° C. and an average molecular weight of approximately 2000.

Example 12

1 kilogram of poly(propylene ether) glycol commercially available from Union Carbide under the trade name "PPG 2025" was heated to 120° C. in a round bottom flask. To this was added 120 ml. (20% excess) of acetic anhydride at such a rate that the temperature of the mixture was kept at 120–140° C. Following the addition, the mixture was heated at 140° C. for 4 hours. It was then cooled and diluted with an equal volume of chloroform, washed with 10% aqueous sodium carbonate, then with water. The organic layer was separated and the chloroform was removed by distillation. Infrared analysis of the purified material showed it to be the diacetate of the poly(propylene ether) glycol with no residual hydroxyl groups.

100 g. of this diacetate was put through the hot tube as in Example 11 except that the packing was glass helices instead of alumina and the temperature was 375° C. The product contained 64% of the theoretical amount of unsaturation expected after the elimination of acetic acid from both terminal acetoxy groups of the poly(propylene ether) glycol diacetate.

Example 13

114 g. of hexol sold under the trade name "NIAX Polyol LS–490" by Union Carbide Chemicals Co. having a molecular weight of 684 was charged to a 1 liter 4 neck flask and heated to 110° C. under vacuum and nitrogen for 1 hour. It was then cooled to approximately 60° C. whereat 0.1 cc. of dibutyl tin dilaurate was added followed by slowly adding 83 g. (1 mole) of allyl isocyanate to keep the temperature in the range 70–80° C. during the addition. After addition, the reaction was allowed to continue for 1 hour at 70° C. The polymeric hexaene product obtained had an average molecular weight of approximately 1200 and a viscosity of 300 centipoises at 70° C.

Example 14

To a 1 liter 4 neck flask was charged 300 milliliters of dimethylformamide, 35 g. of tolylene-2,4-diisocyanate and 0.1 cc. of dibutyl tin dilaurate. A mixture of 11.6 g. of allyl alcohol and 22.8 g. of hexol commercially available from Union Carbide Chemical Co. under the trade name "NIAX Polyol LS–490" having a molecular weight of 684 was slowly added to the flask. Temperature was kept at approximately 65° C. during the addition and for a period of 1 hour. The polymeric product obtained had an average molecular weight of approximately 2100.

Example 15

To a 1 liter 4 neck flask was charged 100 cc. of dimethylformamide, 100 g. of tolylene-2,4-diisocyanate and 0.1 cc. dibutyl tin dilaurate. 58 g. of hexol, i.e. "NIAX Polyol LS–490" by Union Carbide and 34 g. of allyl alcohol were mixed together and added dropwise to the flask. Before the addition to the flask was completed, the reaction, which was exothermic, gelled and the addition was discontinued.

A comparison of Examples 13, 14 and 15 shows that Example 13 is an improvement over Examples 14 and 15 in that it allows one to form polymer without the necessity of a solvent. A comparison of Examples 14 and 15 shows that when starting with a highly functional polyol using the diisocyanate/allyl alcohol technique one must operate in dilute solution to avoid premature crosslinking (i.e., gelation) which renders the polyene product useless as a curable liquid prepolymer. This problem is avoided completely by using the unsaturated monoisocyanate technique illustrated in Example 13.

Example 16

In a 1 liter, 4 neck flask 220 g. of hexol commercially available from Union Carbide Chemicals Co. under the trade name "NIAX Polyol LS–490" (0.32 mole) and 0.1 cc. of dibutyl tin dilaurate was heated to 110° C. under vacuum for 1 hour. After cooling in nitrogen to approximately 60° C., 80 g. of allyl isocyanate was added to the flask by means of a dropping funnel. The exothermic reaction produced a temperature of 100° C. When the addition was complete the reaction was continued at 70° C. for 1 hour. The resulting triene polymer product had an average molecular weight of approximately 950 and a viscosity of 300 centipoises as measured on a Brookfield Viscometer at 70° C.

Example 17

To a 1 liter 4 neck flask was charged 300 g. of a polyester diol (molecular weight 3232) sold under the trade name "RC Polyester S 101–35" by R. C. Division, Hooker Chemical Corp. and 0.1 cc. of dibutyl tin dilaurate. The flask was heated to 110° C. of dibutyl tin dilaurate. The flask was heated to 110° C. under vacuum and maintained thereat for 1 hour. The flask was cooled to approximately 60° C., nitrogen was admitted, and 7.7 g. allyl isocyanate and 8.1 g. of tolylene-2,4-diisocyanate was added by means of a dropping funnel to the reaction at a moderate rate. A maximum temperature of 90° C. was needed. When the addition was complete the reaction was allowed to continue at 70° C. for 1 hour. The thus formed solid polymeric product had an average molecular weight of approximately 6800 and a viscosity of 13,600 centipoises when measured on a Brookfield Viscometer at 70° C.

Example 18

To a 1 liter 4 neck flask heated at 110° C. was charged 808 g. of a polyester diol (having a molecular weight 3232) sold under the trade name "RC Polyester S 101–35" by R.C. Division Hooker Chemical Corp. and 0.1 cc. dibutyl tin dilaurate. The flask was maintained under vacuum at 110° C. for 1 hour. The flask was cooled to approximately 50° C. and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90° C. was produced by the exothermic reaction. The polymeric product obtained was a solid at room temperature but liquid at 70° C. The product had an average molecular weight of approximately 10,500 and a viscosity of 270,000 centipoises at 70° C.

Example 19

Following the procedure of Example 12 and using necessary reactants, a polyene of the following formula was prepared:

Example 20

Following the procedure of Example 3, and using necessary reactants, a polyene of the following formula was prepared:

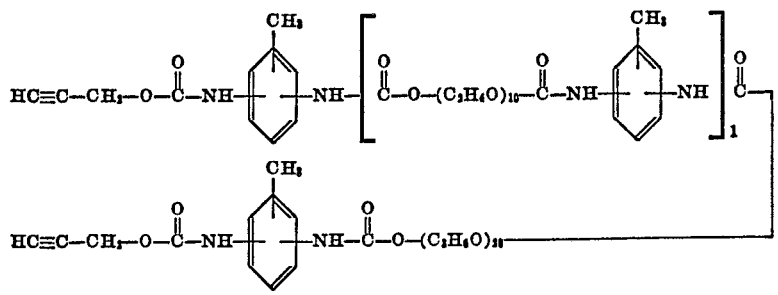

Example 21

A crotyl-terminated polyurethane which contains two reactive double bonds per average molecule in a near terminal position was prepared following the general procedure of Example 3. The resulting polymeric polyene was found to have the following formula:

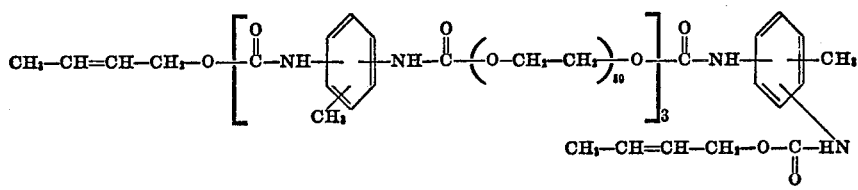

Example 22

Following the procedure of Example 3, and using necessary reactants, a polyene of the following formula was prepared:

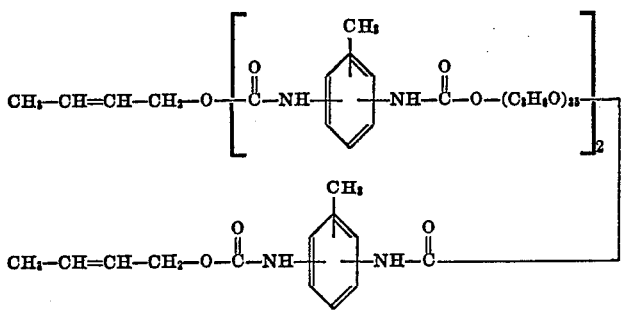

Example 23

Following the procedure of Example 3, and using necessary reactants, a polyene o fthe following formula was prepared:

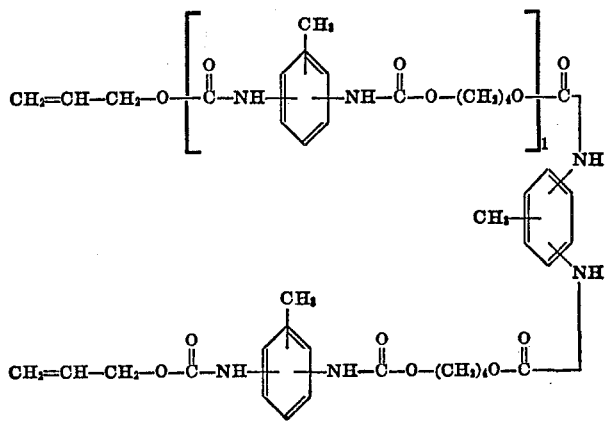

Examples 24–42

Following the general procedure of the prior examples, and using the necessary reactants, a series of polyenes having the formula:

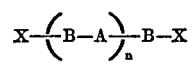

where $n$ is 1 or greater were prepared wherein the derivative members forming the polyenes are defined in the following examples made up in tabular form:

TABLE

| Ex. No. | Component [A] | Component [B] | Component [X] |
|---|---|---|---|
| 24 | HO—CH$_2$—C(CH$_2$Br)(CH$_2$Br)—CH$_2$—OH<br><br>Dibromoneopentyl glycol DOW SA-1138, 3 moles | 2,6-/2,4-tolylene diisocyanate (CH$_3$, NCO, NCO on benzene ring) blend, 4 moles | CH$_2$=C(Cl)—CH$_2$OH<br><br>2-chloro-2-propenol-1, 2 moles |
| 25 | HO—CH$_2$—C(CH$_2$Br)(CH$_2$Br)—CH$_2$OH<br><br>Dibromoneopentyl glycol DOW SA-1138, 5 moles | 2,6-/2,4-tolylene diisocyanate blend, 6 moles | CH$_2$=CHOCH$_2$CH$_2$OH<br><br>2-vinyloxyethanol, 2 moles |
| 26 | HO—CH$_2$—C(CH$_2$Br)(CH$_2$Br)—CH$_2$OH<br><br>Dibromoneopentyl glycol DOW SA-1138, 40 moles | OCNCH$_2$CH$_2$CH$_2$CH$_2$CH$_2$CH$_2$NCO<br><br>Hexamethylene diisocyanate, 41 moles | C$_6$H$_5$—C≡C—CHOH<br><br>1-phenyl-2-propynol-1, 2 moles |
| 27 | N,N,N$^1$,N$^1$-tetrakis(2-hydroxypropyl) ethylene diamine, Wyandotte Quadrol, 2 moles | CH$_3$—NCO, —CH$_2$NCO (on benzene)<br><br>1,3-xylylene diisocyanate, 7 moles | 1-methyl-2-methylolcyclohexene (CH$_3$, CH$_2$OH on cyclohexene), 6 moles |
| 28 | N,N,N$^1$,N$^1$-tetrakis(2-hydroxypropyl) ethylene diamine, Wyandotte Quadrol, 2 moles | OCNCH$_2$CH$_2$CH$_2$CH$_2$CH$_2$CH$_2$NCO<br><br>Hexamethylene diisocyanate, 7 moles | CH$_2$=CHS—CH$_2$CH$_2$OH<br><br>Vinyl hydroxyethyl sulfide, 6 moles |
| 29 | N,N,N$^1$,N$^1$-tetrakis (2-hydroxypropyl) ethylenediamine, Wyandotte Quadrol, 2 moles | 2,4-tolylene diisocyanate, 7 mole | H—N—[—CH(C$_6$H$_5$CH$_2$)CH=CH$_2$]$_2$<br><br>Di(3-benzylallyl)amine, 6 moles |
| 30 | Phosphorous based Polyol Pluracol® 208 Polyol, Wyandotte Chem. Corp., 2 moles | OCN—C$_6$H$_4$—CH$_2$—C$_6$H$_4$—NCO<br><br>Methylene bis(4-phenyl isocyanate), 3 moles | HOCH$_2$—C(CH$_2$CH$_3$)(CH$_2$—OCH$_2$CH=CH$_2$)(CH$_2$—OCH$_2$CH=CH$_2$)<br><br>1,1,1-trimethylolpropanediallyl ether, 2 moles |
| 31 | HO—(CH$_2$CH$_2$CH$_2$CH$_2$O)$_{14}$—H<br><br>Polymeg® from Quaker Oats Co., 2 moles | Methylene bis-(4-cyclohexyl isocyanate with S in ring), 3 moles | HO—CH$_2$—(CH$_2$)$_8$—CH=CH$_2$<br><br>Omega-undecylenyl alcohol |

TABLE—Continued

| Ex. No. | Component [A] | Component [B] | Component [X] |
|---|---|---|---|
| 32 | Tetrafluorosuccinic acid, 10 moles (HO-CO-CF₂CF₂-CO-OH) | Diphenylsilanediol, 9 moles | N-methyl-N-vinyl ethanolamine, 2 moles (HO-CH₂CH₂-N(-CH₃)-CH=CH₂) |
| 33 | 1,2-cyclohexanediol, 5 moles | 1,5-naphthalene diisocyanate, 6 moles | 2-(2-pyridyl)-allyl alcohol (HO-CH₂-C(=CH₂)-pyridyl) |
| 34 | Propylene glycol, 6 moles (HO-CH₂CH(CH₃)-OH) | Isophthalic acid, 5 moles | 3-phenyl-allyl isocyanate, 2 moles (OCN-CH₂-CH=CH-C₆H₅) |
| 35 | Diphenylsilanediol, 6 moles | Methylene bis-(4-cyclohexyl isocyanate), 5 moles | 2-methyl-allyl isocyanate, 2 moles (OCN-CH₂-C(CH₃)=CH₂) |
| 36 | Poly(ethylene imine), 1 mole, H₂N-(CH₂CH₂NH)₃₀-CH₂CH₂NH₂ | None | 9-decenyl isocyanate, 3 moles, OCN-(CH₂)₈-CH=CH₂ |
| 37 | Dibromoneopentyl glycol DOW SA-1138, 3 moles (HO-CH₂-C(CH₂Br)₂-CH₂-OH) | Hexamethylene diisocyanate, 4 moles, OCN-(CH₂)₆-NCO | 2-chloro-2-propen-1-ol, 2 moles (HO-CH₂-C(Cl)=CH₂) |
| 38 | 1,4-di(aminomethyl) cyclohexane, 10 moles, H₂N-CH₂-(thiophene)-CH₂NH₂ | Adipic acid, 11 moles, HOOC-(CH₂)₄-COOH | 2-(P-methoxybenzyl) allyl amine, 2 moles, H₂N-CH₂-C(=CH₂)-CH₂-C₆H₄-OCH₃ |
| 39 | Tetrafluoroethylene glycol, 3 mols, HO-CF₂CF₂-OH | Trimellitic anhydride, 1 mole | 4-vinyloxybenzyl alcohol, 3 moles, HO-CH₂-C₆H₄-O-CH=CH₂ |

TABLE—Continued

| Ex. No. | Component [A] | Component [B] | Component [X] |
|---|---|---|---|
| 40 | HO—(CH₂CH₂O)₁₃₀—H<br><br>Poly(ethylene ether) glycol, 1 mole, | None | OCN—(CH₂)₃—CH=CH₂<br><br>4-pentenylisocyanate, 2 moles, |
| 41 | Pluracol® 208 Phosphorus-based polyol, Wyandotte Chem, Co., 1 mole, | DDI® Diisocyanate Dimer Acid-based diisocyanate, General Mills Co., 2 moles, | CH₂OCH₂CH=CH₂<br>\|<br>HO—CH₂—C—C₂H₅<br>\|<br>CH₂OCH₂CH=CH₂<br><br>1,1,1-trimethylol-propanediallyl ether, 2 moles, |
| 42 | CH₃    CH₃<br>\|      \|<br>HO—CH—CH₂  CH₂CH—OH<br>         \\  /<br>         N—CH₂CH₂—N<br>         /  \\<br>HO—CH—CH₂  CH₂CH—OH<br>\|      \|<br>CH₃    CH₃<br><br>N,N,N',N'-tetrakis(2-hydroxypropyl)-ethylene diamine Wyandotte Co., Quadrol®, 1 mole, | OCN—CH—(CH₂)₄—CH₂—NCO<br>      \|<br>      CH₃<br><br>2,7-di(isocyanato)-heptane, 4 moles, | HO—CH₂—CH₂—N—C=O<br>              \|    \\<br>              CH   CH<br>              \|\|   \|\|<br>              CH—CH<br><br>N-(2-furyl)-N-vinyl ethanolamine, 4 moles. |

CHEMICAL CURING PROCESS

Example 43

0.01 mole of the allyl-terminated liquid Prepolymer A was charged to a 2 oz. glass bottle along with a stoichiometric amount to react with the allyl groups, i.e., 0.0066 mole, of trimethylolpropane tris(β-mercaptopropionate) having a molecular weight of 398. The liquid reactants were stirred together periodically during heating for ½ hour at 140° C. Thereafter the reactants were left under ambient conditions of room temperature and pressure. After 2½ days the liquid reactants became viscous and at the end of a 2 week period, a solid, self-supporting, cured, odorless, elastomeric polythioether product resulted.

Example 44

0.005 mole of the allyl-terminated liquid Prepolymer A was charged to a 2 oz. glass jar along with a stoichiometric amount of a polythiol to react with the CH=CH— groups of the polyene, i.e., 0.0025 mole of pentaerythritol tetrakis(thioglycolate) having a molecular weight of 432. The liquid reactants were mixed together and stirred frequently while heating for ½ hour at 130° C. Thereafter the reactants were left indoors under ambient conditions at atmospheric pressure. At the end of a one week period, a solid, odorless, elastomeric, cured polythioether polymer resulted.

Example 45

Example 44 was repeated except that 0.0025 mole of pentaerythritol tetrakis(β-mercaptopropionate), molecular weight 488, was substituted for the pentaerythritol tetrakis(thioglycolate) in Example 44. After a one week period, a solid, odorless, elastomeric, cured polythioether polymer resulted.

Example 46

Example 44 was repeated except that 0.0033 mole of trimethylolpropane tris(β-mercaptopropionate) having a molecular weight of 398 was substituted for the pentaerythritol tetrakis(thioglycolate). The reaction mixture began curnig when taken from the oven and a solid, odorless, self-supporting, cured elastomeric polythioether polymer resulted after 1½ days.

Example 47

0.005 mole of the allyl-terminated liquid Prepolymer E was charged to a 2 oz. glass jar along with a stoichiometric amount of a polythiol to react with the allyl groups in Prepolymer E, 0.0036 mole of trimethylolpropane tris(β-mercaptopropionate). The liquid reactants were stirred together briefly at room temperature and allowed to stand under ambient conditions. After eight hours a solid, odorless, self-supporting, cured elastomeric polythioether polymer resulted.

Example 48

Example 47 was repeated except that 0.0027 mole of pentaerythritol tetrakis (β-mercaptopropionate) was substituted for the trimethylolpropane tris(β-mercaptopropionate) and the reactants were stirred for ½ hour at 130° C. before curing under ambient conditions. After 4 hours a cured solid, odorless, self-supporting, elastomeric polythioether polymer resulted.

Example 49

0.005 mole of the HC≡C— terminated liquid Prepolymer B was charged to a 2 oz. glass jar along with a stoichiometric amount to react with the HC≡C— groups in Prepolymer B of trimethylolpropane tris(β-mercaptopropionate) (0.0033 mole). The reactants were stirred together and stirred for 4 hours at 130° C. After a 2 week period a cured, solid, odorless, self-supporting, elastomeric polythioether polymer resulted.

Example 50

0.005 mole of the allyl-terminated liquid Prepolymer F. was charged to a 2 oz. glass jar along with a stoichiomertic amount to react with the allyl groups of the prepolymer, i.e., 0.0033 mole of trimethylolpropane tris(β-mercaptopropionate) having a molecular weight of 398. The liquid reactants were stirred together for ½ hour at 140° C. Thereafter the reactants were cured under ambient conditions. After 2½ days the liquid reactants began curing and at the end of a 2 week period, a solid, odorless, self-supporting, cured elastomeric polythioether polymer resulted.

The following examples show the curing reaction of the instant invention as catalyzed by a peroxide. In all the examples 10 g. of the allyl-terminated liquid polyene prepolymer were admixed in a 2 oz. glass jar with a stoichiometric amount of a polythiol, i.e. pentaerythritol tetrakis (β-mercaptopropionate) sufficient to react with all the allyl groups on the prepolymer. In addition, the peroxide was added along with an accelerator for the peroxide. The reactants were briefly stirred and then left to cure indoors at ambient conditions. The results follow:

| Example No. | Polyene prepolymer | Peroxide (g.) | Accelerator (g.) | Curing observations |
|---|---|---|---|---|
| 51 | I | 0.1 g. benzoyl peroxide | 0.2 g. dimethyl aniline | Cured instantly while mixing. |
| 52 | I | 0.4 g. of 69% cumene hydroperoxide | 0.1 g. cobalt naphthanate | Cured to a solid in 7 days. |
| 53 | I | 0.1 g. cyclohexanone peroxide | 0.2 g. dimethyl aniline and 0.01 g. cobalt naphthanate. | Do. |

The following Examples 54–59 show curing of filled composition when catalyzed by oxygen. In all examples, 10 g. of the allyl-terminated liquid prepolymer were charged to a 2 oz. glass jar along with a stoichiometric amount of a polythiol curing agent, i.e. pentaerythritol tetrakis ($\beta$-mercaptopropionate) and a filler. The mixture was stirred briefly and then cured under ambient conditions. A comparison of Examples 57 and 58 shows the necessity of having a polythiol present to obtain a cured solid polymer.

| Example No. | Prepolymer | Filler (g.) | Polythiol [1] | Curing observations |
|---|---|---|---|---|
| 54 | I | 8.0 g. Emtal talc [2] | A | Cured to an odorless solid in 4 hrs. |
| 55 | I | 8.0 g. Unimal 303 [3] | A | Do. |
| 56 | I | 8.0 g. Desertalc 132 [4] | A | Cured to an odorless solid in 24 hrs. |
| 57 | I | 3.0 g. HiSil 233 [5] | A | Cured to an odorless solid in 1½ hrs. |
| 58 | I | 3.0 g. HiSil 233 [5] | None | No cure after 30 days. |
| 59 | I | 3.0 g. HiSil+5 g. TiO$_2$ | A | Cured to an odorless solid in 4 hrs. |

[1] A=pentaerythritol tetrakis ($\beta$-mercaptopropionate).
[2] A talc commercially available from Eastern Magnesia Talc Co., Burlington, Vt.
[3] Polyaluminum silicate manufactured by United Clay Mines, Trenton, N.J.
[4] An acicular platey talc commercially available from Desert Minerals Inc., Los Angeles, Calif.
[5] A reinforcing silica commercially available from Columbia Southern Chemical Corp., Pittsburgh, Pa.

The following examples show the operability of various liquid polyene and polythiol systems to form cured solid polymers by the process of the instant invention.

Example 60

1510 g. of a commercially available poly(oxypropylene) glycol sold under the trade name "Pluracol P 2010" by Wyandotte Chemical Corp. was charged to a resin kettle maintained under a nitrogen atmosphere and equipped with a condenser, stirrer, thermometer and gas inlet and outlet. The reactant was degassed at room temperature for 3 hours. 265.4 g. of an 80–20% isomer mixture of tolylene-2,4-diisocyanate and tolylene-2,6-diisocyanate respectively sold under the trade name "Mondur TD 80" was charged to the kettle and the kettle was heated for 2 hours at 120° C. with stirring under nitrogen. Thereafter, 116.9 g. (2 moles) of allyl alcohol was added to the kettle and the mixture was refluxed for 16 hours at 120° C. Excess allyl alcohol was stripped by vacuum at 115° C. for 23 hours. The thus-formed

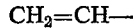

terminated polyene prepolymer had a molecular weight of approximately 2460–2500, and a viscosity of 16,000 cps. as measured on a Brookfield Viscometer at 30° C.

0.005 mole of the thus-formed polyene and 0.005 mole of trimethylolpropane triallyl ether were charged to a 2 oz. glass jar along with a stoichiometric amount of the polymeric dithiol prepared in Example 66. After adding 0.063 gram of benzoyl peroxide and 0.15 gram of dimethylaniline, the mixture in the glass jar was immediately stirred. Thereafter the mixture was poured into a plastic mold for curing. Within 30 minutes a solid, self-supporting, odorless, cured elastic polymer resulted.

Example 61

4.5 grams (0.02 mole) diallyl adipate were charged to a 2 oz. glass bottle along with a stoichiometric amount of a polythiol to react with the CH$_2$=CH— groups in the diallyl adipate, i.e., 4.9 g. (0.01 mole) of pentaerythritol tetrakis ($\beta$-mercaptopropionate), 0.05 g of lauroyl peroxide and 0.15 g. dimethylaniline. The reactants were stirred briefly and then placed on the bench top at ambient conditions. A self-supporting, solid, odorless, cured polythrioether polymer resulted in less than 15 minutes.

Example 62

Example 61 was repeated except that 0.02 mole of diallyl phthalate was substituted for the diallyl adipate. A self-supporting, solid, odorless, cured polythioether polymer product resulted in less than 30 minutes.

Example 63

Example 61 was repeated except that 0.02 mole of diallyl succinate was substituted for the diallyl adipate. A self-supporting, solid, odorless, cured polythioether product resulted in 30 minutes.

Example 64

Example 61 was repeated except that 0.02 mole of 2,p-diallyloxypropane was substituted for the diallyl adipate. A self-supporting, solid, odorless, cured polythioether polymer product resulted in less than 15 minutes.

Example 65

1.9 grams (0.02 mole) of diallyl amine were charged to a 2 oz. glass bottle along with a stoichiometric amount of polythiol to react with the vinyl groups in the diallyl amine, i.e., 4.9 g. (0.01 mole) of pentaerythritol tetrakis ($\beta$-mercaptopropionate), 0.04 g. benzoyl peroxide and 0.1 g. dimethylaniline. The reactants were stirred briefly. In less than 15 minutes a self-supporting, solid, odorless, cured, clear, rubbery polythioether polymer resulted.

The following shows another example of the curing of a polymeric thiol-containing compound and a vinyl-terminated polymer.

Example 66

1.5 moles of $\beta$-mercaptopropionic acid, 0.5 mole of a commercially available poly(propylene ether) glycol sold under the trade name "Pluracol P-2010" by Wyandotte Chemical Corp. and 0.1 g. p-toluenesulfonic acid and 50 ml. benzene were charged to a resin kettle maintained under a nitrogen atmosphere and equipped with a condenser, stirrer, thermometer and gas inlet and outlet. The mixture was heated and the benzene-water azeotrope was collected. The actual amount of water collected amounted to 17.5 g. The reaction was vacuum-stripped for several hours at 70° C. to remove benzene. The resulting polythiol polymer had a molecular weight of about 2210–2230 and an average functionality of 2 and was collected for use herein.

659 g. (0.145 mole) of a poly(propylene ether) triol commercially available from Wyandotte Chemical Corp. under the trade name "Pluracol TPE 4542" having a molecular weight of about 4500 and a hydroxyl number of 37.1, and 0.3 g. of dibutyl tin dilaurate were charged to a resin kettle maintained under a nitrogen atmosphere and equipped with a condenser, stirrer, thermometer and gas inlet and outlet. The reactants were maintained at 110° C. for 1 hour and then cooled under nitrogen to room temperature. 25.2 g. (0.435 mole) of allyl alcohol was added to the kettle followed by 75.7 g. (0.435 mole) of an 80–20% isomer mixture of tolylene-2,4-diisocyanate and tolylene 2,6-diisocyanate respectively sold under the trade name "Mondur TD 80". The temperature reached 55° C. in 6 minutes. A sample was titrated for NCO resulting in 6.02 mg. NCO/g. after 20 minutes. After 1 hour the NCO titration showed 0.997 mg. NCO/g. The polyene polymer had a molecular weight of about 5200 and an average functionality of 3 and was vacuum stripped at 70° C. for 1 hour and then collected. 0.003 mole of the polythiol polymeric material formed supra was charged to a 2 oz. glass jar along with 0.002 mole of the allyl-terminated polyene polymer formed herein, 0.10 g. benzoyl peroxide and 0.20 g. dimethylaniline. The reactants were stirred briefly. In less than ½ hour a self-supporting, solid, odorless, clear, cured polythioether polymer product resulted.

Example 67

3 grams of a linear saturated hydrocarbon backbone ethylene/propylene/nonconjugated diene terpolymer commercially available under the trade name "Nordel" by E. I. du Pont de Nemours & Co., which has been visbroken until it had a reduced specific viscosity of 0.99 and contained 0.4 vinyl, 6.4 trans and 0.4 vinylidene unsaturated groups per 1000 carbon atoms, were dissolved in 100 ml. of benzene in a flass jar. A 50% excess over the stoichiometric amount, i.e., 0.0006 mole (0.3 g.) of pentaerythritol tetrakis($\beta$-mercaptopropionate) was added to the jar in addition to 0.015 g. benzoyl peroxide and 0.03 g. dimethylaniline. The glass jar was set aside under ambient conditions. After 24 hours the benzene had substantially epaporated leaving a gelatinous polymeric precipitate. Acetone was added to precipitate more polymer. The polymer was filtered off, washed with acetone and dried in a vacuum oven at 60° C.

2.3 grams of the above polythioether polymer product was extracted with benzene along with a "control" sample of the starting visbroken "Nordel" material. The "control" sample showed a nil gel content (benzene insoluble) whereas the peroxide cured (crosslinked) solid polythioether polymer product had a gel content in excess of 50%.

Example 68

643 grams (0.32 mole) of a commercially available poly(propylene ether) glycol sold under the trade name "Puracol P 2010" by Wyandotte Chemical Co. were degassed at room temperature for 1 hour and then charged to a resin kettle maintained under a nitrogen atmosphere and equipped with a condenser, stirrer, thermometer and gas inlet and outlet. 111.4 grams (0.64 mole) of an 80–20% isomer mixture of tolylene-2,4-diisocyanate and tolylene-2,6-diisocyanate, respectively, sold under the trade name "Mondur TD 80," were added to the kettle. After 45 minutes, the temperature was raised to 120° C. and the reaction was continued for 50 minutes. A sample was removed and titrated for NCO, resulting in 33.54 mg. NCO/g. 62.7 grams of diallyl amine were added at 105° C. and the reaction was continued for 10 minutes. A sample was titrated resulting in an NCO content of 1.20 mg. NCO/g. A vacuum was applied to the kettle for 1 hour at 90° C. followed by cooling under nitrogen. The resulting product had a molecular weight of about 2540–2580 and an ene functionality of 4.

10 grams of the thus-formed polymer were charged to a 2 oz. glass jar along with 2 g. of pentaerythritol tetrakis($\beta$-mercaptopropionate) and 0.06 g. azobisisovaleronitrile. The liquid reactants were briefly stirred together and set aside under ambient conditions. Within 30 minutes a solid, odorless, elastomeric, cured polythioether product was obtained.

Example 69

215 grams of poly(ethylene imine) commercially available from Dow Chemical Co. under the trade name "Montrek 18" along with 41.5 g. allyl isocyanate were charged to a resin kettle maintained under a nitrogen atmosphere and equipped with a condenser, stirrer, thermometer and gas inlet and outlet. The reactants were maintained at 70 to 80° C. during addition. The reaction was continued for 1 hour at 70° C.

10 grams of the thus-formed polymer were charged to a 2 oz. glass jar along with 1.5 g. of pentaerythritol tetrakis ($\beta$-mercaptopropionate) and 0.25 g. of azobisisobutyronitrile. The mixture was briefly stirred and placed in a warm room at about 120° F. Within 2 hours a solid, self-supporting, odorless, cured polymer product was formed.

Example 70

The polymeric polythiol (0.003 mole, $f=2$) from Example 66 was admixed with a stoichiometric amount (0.002 mole, $f=3$) of a monomeric polyene, glycerol trioleate (triolein, molecular weight 885), 0.05 g. benzoyl peroxide and 0.10 g. dimethylaniline. The jar containing the reactants after mixing was set aside under ambient conditions. Within ½ hour the liquid mixture was converted to a self-supporting, solid, odorless, clear, rubbery, cured polythioether product.

The following example shows the operability of the instant invention when the polyene contains acetylenic linkages.

Example 71

400 grams (0.20 mole) of a commercially available liquid polymeric diisocyanate sold under the trade name "Adiprene L–100" by E. I. du Pont de Nemours & Co. were charged to a dry resin kettle maintained under a nitrogen atmosphere and equipped with a condenser, stirrer, thermometer and gas inlet and outlet. 25.2 grams (0.45 mole) of propargyl alcohol were charged to the kettle and the reaction was continued for 17 hours with stirring at 100° C. Thereafter the nitrogen atmosphere was removed and the kettle was evacuated 15 hours at 100° C.

10 grams of the propargyl terminated liquid prepolymer, 3.0 grams of pentaerythritol tetrakis ($\beta$-mercaptopropionate), 0.06 gram of benzoyl peroxide and 0.15 gram of dimethylaniline were admixed in a 2 oz. glass jar, stirred briefly and set aside under ambient conditions. Within ½ hour a solid, odorless, self-supporting, cured, elastomeric polymer product resulted.

The following example shows the necessity of having a free radical generator present, e.g., oxygen, in order to cure by the instant invention.

Example 72

40 grams of Prepolymer I and 10 grams of a filler sold commercially under the trade name "Hi Sil 233" by Columbia Southern Chemical Corp. were charged under nitrogen to a 200 ml. round bottom 3-necked flask maintained under a nitrogen atmosphere and mixed thoroughly. The flask was heated by a water bath to 60° C. under full vacuum for 2 hours. The flask was then allowed to cool under vacuum. 4 grams of pentaerythritol tetrakis ($\beta$-mercaptopropionate) were charged to the flask under nitrogen and the reaction was stirred continuously. After 6½ days under nitrogen, no cure was noted. The reaction was then exposed to oxygen from the atmosphere and a solid, cured odorless, elastomeric product resulted within 45 minutes.

Example 73

125 g. of Prepolymer E from Example 5 herein was charged to an Erlenmeyer flask equipped with a magnetic stirrer and connected by tubing to another Erlenmeyer flask containing 54 g. of trimethylolpropane tris ($\beta$-mercaptopropionate). The system was evacuated (0.05 mm.)

while heating the polymer to 100° C. with stirring. After 2 hours all bubbling ceased. An additional ½ hour evacuation was performed. Thereafter the trimethylolpropane tris (β-mercaptopropionate) was poured into the flask containing Prepolymer E under nitrogen. After stirring to insure good mixing, heat was removed and the reaction was continued under nitrogen for 4 days. No curing was observed. A sample of the unreacted material was removed from the Erlenmeyer flask under nitrogen and placed in a 2 oz. jar. The sample was exposed to ambient conditions indoors and in about 40 minutes evidence of curing (viscosity change) was observed. Within 8 hours, an odorless, solid, elastomeric, cured polymer product was obtained.

The following example shows the ability to retard the curing process of the instant invention by the use of antioxidants.

Example 74

10 g. of Prepolymer E from Example 5 was added to each of three 2 oz. jars. To one of the jars was added 3 ml. of benzene containing 0.5% based on the weight of the prepolymer of an antioxidant sold under the trade name "Santonox" commercially available from Monsanto Chemical Co. To another of the jars containing Prepolymer E was added 3 ml. of benzene containing 0.5% based on the weight of the prepolymer of an antioxidant sold under the trade name "Dalpac FG" commercially available from Hercules Powder Co. To the third jar was added 3 ml. of benzene as a control. To blend the components the jars were heated in a forced draft oven set at 150° C. for 25 minutes with frequent stirring. The jars were withdrawn from the oven and 1.3 g. of trimethylolpropane tris (β-mercaptopropionate) was added to each of the jars and curing was initiated indoors under ambient conditions. The control run, without any antioxidant present, cured within ½ hours to a solid elastomeric polymer product. The example containing "Dalpac FG" cured to a solid polymer product after 12 days whereas the sample containing "Santonox" required more than 2 weeks before a solid self-supporting, cured polymeric product resulted.

The polyenes used in the instant invention may be used as blends or mixtures of monoenes or polyenes having the same or different functionalities so long as the average functionality of the blend or mixture is at least 2. Similarly, the polythiols used herein may be used as blends or mixtures of monothiols or polythiols having the same or different functionalities as long as the average functionality of the blend or mixture is at least 2.

The polyene/polythiol mole ratio is selected so as to provide a solid final cured product, i.e., one that is non-flowing and structurally self-supporting under ambient conditions. In typical cases, as shown by the examples, this ratio can be about 0.2 to 5 moles thiol groups per mole ene groups. In general the mole ratios significantly above or below 1 tend to give a high proportion of chain extension or grafting whereas mole ratios near 1 give predominantly chain extension and crosslinking. Occasionally, however, ratios necessary to give a solid as aforesaid may lie outside the stated range, and experimentation may be necessary to determine a suitable ratio to give a solid. This experimentation is easily carried out, and offers no difficulties to those skilled in the art. Examples 75–80 and 81–86 show how to vary the ratio and how one can empirically determine the amount of polythiol necessary to react with the polyene to obtain a solid, self-supporting, cured polymeric product.

Examples 75–80 show the ability to use mixtures of the polythiols and how to empirically determine the amount of polythiol necessary to form cured, solid, self-supporting polymeric products by the instant invention.

As shown in Examples 75–80, 30 grams of Prepolymer I from Example 8 were admixed with varying ratios of a mixture of polythiols and cured in the presence of a peroxide with dimethylaniline as a peroxide activator.

In Examples 81–86, 30 grams of Prepolymer I from Example 8 were admixed with varying amounts of a polythiol, i.e., pentaerythritol tetrakis (β-mercaptopropionate) along with 1.5 g. of 10% benzoyl peroxide (in benzene) and 0.3 g. of dimethylaniline. The mixture was briefly stirred in a 2 oz. glass jar and then transferred to a shallow aluminum foil dish. The mixtures were then allowed to cure indoors under ambient conditions. The results of the amount of reactants necessary for a self-supporting polymeric structure are shown.

EXAMPLES 75–80

| Example No. | Polyene polymer [1] | Polythiol mixture Q-43 [2] (g.) | Polythiol mixture E-23 [3] (g.) | 10% solution in benzene of benzoyl peroxide (g.) | Dimethyl aniline (g.) | Curing time (minutes) | Shore A hardness | Self-supporting structure |
|---|---|---|---|---|---|---|---|---|
| 75 | I | 2.9 | 0 | 1.5 | 0.3 | 3 | 23 | Yes. |
| 76 | I | 2.3 | 0.6 | 1.5 | 0.3 | 6 | 13 | Yes. |
| 77 | I | 1.7 | 1.2 | 1.5 | 0.3 | 7 | 0 | Yes. |
| 78 | I | 1.2 | 1.7 | 1.5 | 0.3 | 9 | 0 | Yes. |
| 79 | I | 0.6 | 2.3 | 1.5 | 0.3 | No cure | | No. |
| 80 | I | 0 | 2.9 | 1.5 | 0.3 | ...do... | | No. |

[1] Polyene Prepolymer I from Example 8.
[2] Q-43=pentaerythritol tetrakis (β-mercaptopropionate) commercially available from Carlisle Chemical Co.
[3] E-23=ethylene glycol bis (β-mercaptopropionate).

EXAMPLES 81–86

| Example No. | Polyene polymer [1] | Polythiol Q-43 [2] (g.) | 10% benzoyl peroxide (g.) | Dimethyl aniline (g.) | Curing time (minutes) | Shore A hardness | Self-supporting structure |
|---|---|---|---|---|---|---|---|
| 81 | I | 1.7 | 1.5 | 0.3 | 7 | 0 | Yes. |
| 82 | I | 1.5 | 1.5 | 0.3 | 14 | 0 | Yes. |
| 83 | I | 1.2 | 1.5 | 0.3 | No cure in 72 hrs | | No. |
| 84 | I | 0.9 | 1.5 | 0.3 | ...do... | | No. |
| 85 | I | 0.6 | 1.5 | 0.3 | ...do... | | No. |
| 86 | I | 0.3 | 1.5 | 0.3 | ...do... | | No. |

[1] 30 g. polyene Prepolymer I from Example 8.
[2] Q-43=pentaerythritol tetrakis (β-mercaptopropionate) commercially available from Carlisle Chemical Co.

EXAMPLE 87

The following formulations were made up:

| Ingredients | Formulation No. | |
|---|---|---|
| | I (parts) | II (parts) |
| Prepolymer D from Example 4 | 100 | 100 |
| TiO₂ (pigment) | 4 | 4 |
| Unimal 507 (kaolin clay) | 60 | 85 |
| Unimal 303 (kaolin clay) | 25 | 0 |
| Thickening agent (75% silica gel-25% asbestos fibers) | 4 | 4 |
| Pentaerythritol tetrakis β-mercaptopropionate) | 10 | 10 |

The above formulations were briefly admixed for homogeneity and thereafter air cured indoors. Formulation I cured in approximately 6 hours to an elastomeric sealant whereas Formulation II cured in two days to an elastomeric sealant.

Example 88

10 grams of Prepolymer D were charged to a 2 oz. glass jar along with 0.7 g. of ethylene glycol bis(mercaptopropionate) 2.2 g. pentaerythritol tetrakis β-mercaptopropionate), 0.5 g. 10% benzoyl peroxide in benzene and 0.1 g. N,N-dimethylaniline. The reactants were briefly stirred and then placed between two pieces of aluminum foil, each of 5 mil thickness. The aluminum foil was pressed together by hand to insure good adhesion. After 1 hour an attempt was made to pull the aluminum foil apart. The aluminum foil tore before the adhesive was destroyed.

Example 89

50 grams of Prepolymer H along with 5.0 g. of pentaerythritol tetrakis (β-mercaptopropionate), 2.5 g. of a 10% benzoyl peroxide in benzene and 0.5 g. N,N-dimethylaniline were stirred together briefly in a glass jar and then poured into an aluminum mold in the shape of a shallow dish. The mold was allowed to set for 5 hours after which time the mold was torn away from the molded article which set to a solid in the exact shape of the mold.

Example 90

0.005 mole of Prepolymer E from Example 5 was charged to a 2 oz. glass jar along with 0.0033 mole of trimethylolpropane tris (β-mercaptopropionate), 0.2 g. benzoyl peroxide and 0.5 g. dimethylaniline. The reactants were stirred briefly and then coated onto a piece of 17 pt. clay coated paper by means of a No. 10 rod. The paper was then set aside at ambient conditions. After 10 minutes a clear, solid coating resulted on the paper. The same technique was used successfully to coat cellophane, aluminum foil, steel plate stock, "Mylar" polyester film, plywood, and a concrete block of the type used in building construction.

Example 91

20 grams of the polymeric product from Example 10 was mixed in an aluminum dish with 2.2 g. of pentaerythritol tetrakis (β-mercaptopropionate) commercially available from Carlisle Chemical Co. under the trade name "Q-43", 0.10 g. benzoyl peroxide and 0.2 g. dimethylaniline. The sample cured to a tack-free solid which had a color of less than 1 on the Gardner Scale. After exposure in a Fadeometer for 50 hours, the color increased to a value of 4 on the Gardner Scale.

A similar polymer prepared from "PPG-2025," tolylene-2,4-diisocyanate and allyl alcohol, cured with pentaerythritol tetrakis (β-mercaptopropionate) and acetophenone by irradiation with ultraviolet light also had a Gardner color of less than 1. However, after 50 hours in the Fadeometer the Gardner color rose to 13.

Example 92

5.2 grams of decaglycerol dioleate (Drew Chemical Corp.) and 2.0 grams of ethylene glycol bis β-mercaptopropionate) were dissolved in ethanol in an aluminum tray. 0.04 gram of benzoyl peroxide and 0.1 gram dimethylaniline were added to the mixture and the mixture was set aside under ambient conditions. After 3 days the product had not solidified to a crosslinked network.

Example 93

94.5 grams of dimer acid commercially available from Emery Industries, Inc., under the trade name "Empol 1010" and 103.5 grams of allyl alcohol were admixed in benzene in a 2-neck flask. The reaction was heated gently for 19 hours at 80° C. at which time it was determined by titration that less than 6% of the carboxyl group content was unreacted. The reaction was discontinued and the reactants were washed with water. The thus-formed emulsion was salted out thoroughly, the benzene layer was separated and dried to remove residual moisture. The benzene was distilled off in vacuum to obtain the diallyl ester of dimer acid.

The diallyl ester of the dimer acid product (30 grams) was admixed with "Q-43" in a 1:1 mole ratio along with 0.15 gram benzoyl peroxide and 0.3 gram dimethylaniline in an aluminum tray. After 30 minutes a cured solid product resulted.

The curing example was repeated except that the mole ratio of the diallyl ester of dimer acid to "Q-43" was 2:1. The cured product was harder than the product obtained under the 1:1 mole ratio of diallyl ester to "Q-43,"

14 grams of dimer acid, 6 grams of pentaerythritol tetrakis(β-mercaptopropionate), 0.07 gram benzoyl peroxide and 0.15 gram dimethylaniline were mixed in an aluminum tray. The mixture was set aside under ambient conditions. After 22 hours the product had not solidified to a cross-linked network.

EXAMPLES 94-111

| Sample No. | Polyene | Source of polyene | Chemical free radical generating reagent [1] | Polythiol [2] |
|---|---|---|---|---|
| 94 | 1,2,4-trivinylcyclohexane | Aldrich Chemical Co., Inc. | Benzoyl peroxide | Q-43 |
| 95 | 1,5-hexadiene | do | do | Q-43 |
| 96 | Diallyl terephthalate | Chemicals Procurement Lab. Inc. | do | Q-43 |
| 97 | Diallyl oxalate | Monomer-Polymer Labs., Inc. | do | Q-43 |
| 98 | Diallyl 1,4-cyclohexanedicarboxylate | do | do | Q-43 |
| 99 | Tetraallyl orthosilicate | Aldrich Chemical Co., Inc. | do | Q-43 |
| 100 | Diallyl diphenylsilane | Chemicals Procurement Lab. Inc. | do | Q-43 |
| 101 | Diallyl allyl phosphonate | Aldrich Chemical Co., Inc. | do | Q-43 |
| 102 | Diallyl phenyl phosphite | K. & K. Laboratories, Inc. | do | Q-43 |
| 103 | N,N-diallylformamide | Aldrich Chemical Co, Inc. | do | Q-43 |
| 104 | N,N,N',N'-tetraallylmethylenediamine | Monomer-Polymer Labs., Inc. | do | Q-43 |
| 105 | Triallyl cyanurate | Aldrich Chemical Co., Inc. | do | P-33 |
| 106 | 4-vinyl-1-cyclohexene | K. & K. Laboratories, Inc. | do | Q-43 |
| 107 | Diethyleneglycol divinyl ether (.9 mole) diallyl amine (.1 mole) | Polysciences, Inc. / Monomer-polymer Labs., Inc. | do | Q-43 |
| 108 | Triallyl phosphate | Aldrich Chemical Co. Inc. | do | P-33 |
| 109 | Diallyl carbonate | Chemicals Procurement Lab. Inc. | do | Q-43 |
| 110 | N,N-diallyl piperazine | do | do | Q-43 |
| 111 | Allyl diglycol carbonate | CR-39 from PPG Ind. Inc. | do | Q-43 |

[1] Concentration of dimethylaniline curing rate accelerator varied from 1.0 to 3.0 parts/100 parts curable composition; benzoyl peroxide reagent concentration was 0.2 to 0.5 part/100 parts of curable composition. Cure through times ranged from 3 minutes to 15 minutes.

[2] Q-43 is pentaerythritol tetrakis(β-mercaptopropionate; P-33 is trimethylolpropane tris(β-mercaptopropionate). The polythiol is used in the theoretical equivalent amount based on the polyene used.

Examples 112–120

Example 65 was repeated except that the .02 mole of of diallyl amine was replaced by 0.02 mole of the polyenes from Examples 24, 25, 27, 28, 30, 31, 32, 39 and 40, respectively. In each instance a solid cured product was obtained in less than 20 minutes after mixing was completed.

Example 121

916 grams (0.46 mole) of a commercially available liquid polymeric diisocyanate sold under the trade name "Adiprene® L100" by E. I. du Pont de Nemours & Co. were charged to a dry flask maintained under a nitrogen atmosphere and equipped with a condenser, stirrer, thermometer and gas inlet and outlet. 197 grams (0.92 mole) of the diallyl ether of trimethylolpropane were charged to the vessel along with 0.56 g. dibutyl tin dilurate catalyst. The flask and contents were heated with stirring for 30 minutes at 50° C. to yield a polytetraene of about 2400 M.W.

To the tetraene were added 230 grams pentaerythritol tetrakis($\beta$-mercaptopropionate), 1.2 grams dilaurylthiodipropionate, 136 grams of dioctyl phthalate, 1.2 grams Plastanox 2246 (hindered phenol antioxidant sold by American Cyanamid Co.), 6.7 grams benzoyl peroxide and 14 grams dimethylaniline. An aliquot of this chemically curable liquid composition was cast on a glass plate in a layer 40 mils thick. The layer skin cured to a solid through the entire thickness in less than 3 minutes, or at a liquid-to-solid conversion rate of over 13 mils/minute. The solid rubbery product had a Shore A hardness of 60, a tensile strength of 150 p.s.i. and an elongation at failure of 25 percent.

Example 122

An 80/20 mixture of tolylene 2,4-diisocyanate and tolylene 2,6-diisocyanate (1 mole) was reacted with allyl alcohol (2 moles) under the conditions used for the similar synthesis described in Example 116. The resulting diene (3 moles) was mixed with 2.1 moles of the tris(3-mercaptopropyl) ether of tris(2-hydroxyethyl) isocyanurate, 0.5 part benzoyl peroxide and 1.0 part dimethylaniline per 100 parts of curable composition.

100 grams of the above curable composition were placed in a layer 500 mils deep in a small aluminum mold and set aside at ambient conditions. After 5 minutes the liquid composition was cured to a crosslinked solid having a Shore A hardness greater than 20. The conversion from liquid to solid occurred at a rate of over 100 mils/minute.

The solid cured polythioether polymer products resulting from the instant invention have many and varied uses. Examples of some uses include but are not limited to adhesives; caulks; elastomeric sealants; coatings, encapsulating or potting compounds; liquid castable elastomers; thermoset resins; impregnants for fabric, cloth, fibrous webs other porous substrates; laminating adhesives and coatings; mastics; glazing compounds; fiberglass reinforced composites; sizing or surface finishing agents; filleting compounds; cure in place gasketing compounds; rocket fuel binders; foamable thermosetting resins or elastomers; molded articles such as gaskets, diaphragms, balloons, automobile tires, etc.

The molecular weight of the polyenes of the present invention may be measured by various conventional methods, including solution viscosity, osmotic pressure and gel permeation chromatography. Additionally, the molecular weight may be calculated from the known molecular weight of the reactants.

The viscosity of the polyenes and polythiols may be measured on a Brookfield Viscometer at 30° or 70° C. in accord with the instructions therefor.

The components to be cured may be prepared as either single-packaged or multi-packaged liquid polymer systems which may be cured to solid polythioether elastomers without liberating gaseous by-products which cause bubbles and voids in the vulcanizate. Thus, there is provided curable liquid polymer systems composed of polyenes and polythiols in which the components individually are storage stable and which are not sensitive to or deteriorated by traces of moisture or oxygen containing gas such as may be encountered during normal storage or handling procedures. Solid resinous or elastomeric products may be prepared from flowable liquids in a system in which the rate of curing may be inhibited or retarded by the use of chemical inhibitors, antioxidants, inert atmospheres and the like. The cured product may be characterized as in the thermally and oxidatively stable state since there is no reactive carbon-to-carbon unsaturation in the main backbone chain.

As used herein the term polyene and the term polyne refers to single or complex species of alkenes or alkynes having a multiplicity of terminal reactive carbon-to-carbon unsaturated functional groups per average molecule. For example, a diene is a polyene that has two reactive carbon-to-carbon double bonds per average molecule, while a diyne is a polyne that contains in its structure two reactive carbon-to-carbon triple bonds per average molecule. Combinations of reactive double bonds and reactive triple bonds within the same molecule are also possible such as for monovinylacetylene which is a polyeneyne under this definition. For purposes of brevity all these classes of compounds are referred to hereafter as polyenes.

In defining the position of the reactive functional carbon-to-carbon unsaturation, the term terminal is intended to mean that functional unsaturation is at an end of the main chain in the molecule; whereas by near terminal is intended to mean that the functional unsaturation is not more than 10 carbon atoms and typically less than 8 carbon atoms from an end of the main chain in the molecule. The term pendant means that the reactive carbon-to-carbon unsaturation is located terminal or near-terminal in a branch of the main chain as contrasted to a position at or near the ends of the main chain. For purposes of brevity all of these positions are referred to herein generally as terminal unsaturation.

Functionality as used herein refers to the average number of ene or thiol groups per molecule in the polyene or polythiol, respectively. For example a triene is a polyene with an average of three reactive carbon-to-carbon unsaturated groups per molecule and thus has a functionality ($f$) of three. A dithiol is a polythiol with an average of two thiol groups per molecule and thus has a functionality ($f$) of two.

It is to be understood that the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however, the reaction were carried to only 90% of theory for complete reaction, about 10% of the molecules present would have only one ene functional group, and there may be a trace of material that would have no ene functional groups at all. Approximately 90% of the molecules, however, would have the desired diene structure and the product as a whole then would have an actual functionality of 1.9. Such a product is useful in the instant invention and is referred to herein as having a functionality of 2.

The term reactive unsaturated carbon-to-carbon groups means groups which will react under proper conditions as set forth herein with thiol groups to yield the thioether linkage

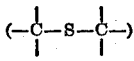

as contrasted to the term unreactive carbon-to-carbon unsaturation which means

groups found in aromatic nucleii (cyclic structures exemplified by benzene, pyridine, anthracene, and the like) which do not under the same conditions react with thiols to give thioether linkages.

Highly water-sensitive groups are intended to include, for example, isocyanate, acylhalide such as acylchloride, anhydride and the like which readily react with water, alcohols, ammonia, amines and the like.

Odorless has been used herein to mean the substantial absence of the well-known offensive and sometimes obnoxious odors that are characteristic of hydrogen sulfide and the derivative family of compounds known as mercaptans.

The term non-yellowing means the substantial resistance during prolonged exposure to actinic radiation such as exposure in sunlight, to unsightly or uncontrollable discoloration.

It is understood that the foregoing detailed description is given merely by way of illustration and that many variations may be made therein without departing from the spirit of this invention.

What is claimed is:

1. A chemically curable composition useful for obtaining an essentially odorless, solid polythioether, said curable composition consisting essentially of:
    (A) a terminally unsaturated polyene component which comprises the formula:

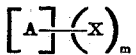

wherein $m$ is an integer of at least 2; wherein X is

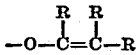

where
        R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from 1 to 9 carbon atoms and said cycloalkyl having from 3 to 8 carbon atoms;
    wherein
        [A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substituted cycloalkyl, aryl and substituted aryl, urethane and substituted urethane, urea and substituted urea, amine and substituted amine, amide and substituted amide, hydroxyl, heterocyclic carbon containing radical, and mixtures thereof; said substituents on said members substituted being defined above, said component having a molecular weight in the range from about 64 to 20,000; and a viscosity in the range from essentially 0 to 20 million centipoises at 70° C.; and (B) a polythiol component having a molecular weight in the range from about 50 to about 20,000 of the general formula:

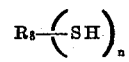

wherein $R_8$ is a polyvalent organic moiety free from reactive carbon-to-carbon unsaturation and $n$ is at least 2, the sum of $m$ and $n$ being greater than 4, with the ene/thiol mole ratio being selected so as to provide a cross-linked solid, self-supporting cured product; and
    (C) a chemical free radical generating reagent.

2. The composition of claim 1 wherein [A] has the formula:

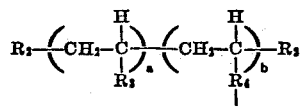

wherein
    $a$ and $b$ are integers greater than 1;
    $R_2$ is a member of the group consisting of hydrogen and alkyl;
    $R_3$ is a member of the group consisting of hydrogen and saturated alkyl;
    $R_4$ is a divalent derivative of the group consisting of phenyl, benzyl, alkyl, cycloalkyl, substituted phenyl, substituted benzyl, substituted alkyl and substituted cycloalkyl,
    said alkyl, cycloalkyl and substituents on members substituted being defined as in claim 1.

3. The composition of claim 1 wherein the mole ratio of ene to thiol is from about 0.5/1 to about 2/1.

4. The composition of claim 1 wherein the mole ratio of ene to thiol is from about 0.75/1 to about 1.5/1.

5. The composition of claim 1 wherein the chemical free radical generating reagent is selected from the group consisting of molecular oxygen; organic hydroperoxides and peroxides; blends of organic hydroperoxides and peroxides with tertiary amines; blends of organic hydroperoxides and peroxides with transition metal salts; and blends of organic hydroperoxides and peroxides with tertiary amines and transition metal salts.

6. A process of forming essentially odorless solid polythioether which comprises
    (I) Admixing:
        (A) a terminally unsaturated polyene component which comprises the formula:

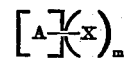

wherein $m$ is an integer of at least 2; wherein X is

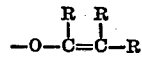

where
            R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from 1 to 9 carbon atoms and said cycloalkyl having from 3 to 8 carbon atoms; wherein

[A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substituted cycloalkyl, aryl and substituted aryl, urethane and substituted urethane, urea and substituted urea, amine and substituted amine, amide and substituted amide, hydroxyl, heterocyclic carbon containing radical, and mixtures thereof; said substituents on said members substituted being defined above, said component having a molecular weight in the range from about 64 to 20,000; and a viscosity in the range from essentially 0 to 20 million centipoises at 70° C.; and (B) a polythiol component having a molecular weight in the range from about 50 to about 20,000 of the general formula:

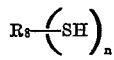

wherein $R_8$ is a polyvalent organic moiety free from reactive carbon-to-carbon unsaturation and $n$ is at least 2, the sum of $m$ and $n$ being greater than 4, with the ene/thiol mole ratio being selected so as to provide a cross-linked solid, self-supporting cured product, and (C) a chemical free radical generating reagent.

7. An article comprising the composition of claim 6 as a coating on a substrate.

8. An article comprising the composition of claim 6 as an adhesive between two substrates.

9. An article comprising the composition of claim 6 as an elastomeric sealant.

10. A shaped, molded article cast from the composition of claim 6.

11. The process of claim 6 wherein the chemical free radical generating reagent is selected from the group consisting of molecular oxygen; organic hydroperoxides and peroxides; blends of organic hydroperoxides and peroxides with tertiary amines; blends of organic hydroperoxides and peroxides with transition metal salts; and blends of organic hydroperoxides and peroxides with tertiary amines and transition metal salts.

12. The composition of claim 1 wherein the polyene has the formula:

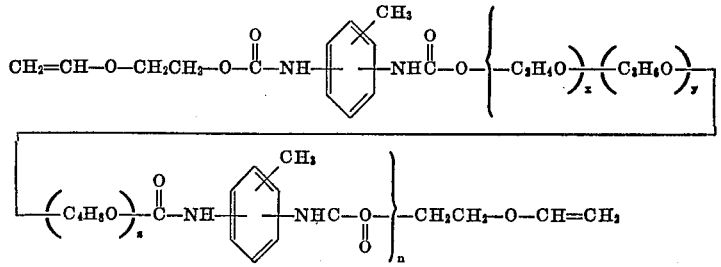

where the sum of $x+y+z$ in each chain segment is at least 1; and $n$ is an integer of 0 or greater.

13. The composition of claim 1 wherein the polyene has formula:

where the sum of $x+y+z$ in each chain segment is at least 1.

14. The composition of claim 1 wherein the polyene has the formula:

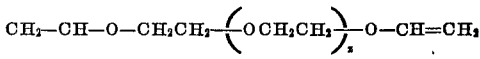

where $n$ is an integer from 0 to about 40.

References Cited

UNITED STATES PATENTS

| | | | |
|---|---|---|---|
| 3,405,181 | 10/1968 | Gourdon | 260—79 |
| 3,278,352 | 10/1966 | Erickson | 260—79 |
| 3,371,072 | 2/1968 | Signouret et al. | 260—79 |
| 3,338,810 | 8/1967 | Warner | 260—79 |
| 3,412,049 | 11/1968 | Gmitter | 260—2.5 R |
| 2,921,006 | 1/1960 | Schmitz et al. | 204—159.15 |

MURRAY TILLMAN, Primary Examiner

R. B. TURER, Assistant Examiner

U.S. Cl. X.R.

260—41 AG, 63 UY, 77.5 BB, 77.5 CR 77.5 MA, 77.5 AM, 79.5 B, 79.5 R, 79.5 NV, 823, 860, 874, 2.5 A, 2.5 R, 17.4 R, 41 A, 41 B, 41 R; 117—93.31, 132 B, 132 R, 138.8 F, 148, 155; 204—159.14, 159.15, 159.18, 159.23, 159.24